US006525715B2

(12) United States Patent
Uchiyama et al.

(10) Patent No.: US 6,525,715 B2
(45) Date of Patent: *Feb. 25, 2003

(54) PORTABLE INFORMATION ACQUISITION DEVICE

(75) Inventors: Yoshiteru Uchiyama, Suwa (JP); Yoshiyuki Kodama, Suwa (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,229

(22) Filed: Jan. 30, 1998

(65) Prior Publication Data

US 2001/0045942 A1 Nov. 29, 2001

(30) Foreign Application Priority Data

Mar. 24, 1997 (JP) .............................. 9-070272

(51) Int. Cl.$^7$ ................................. G09G 5/00
(52) U.S. Cl. ....................................... 345/169
(58) Field of Search ................. 345/169, 168, 345/173, 156; 463/37; 358/473

(56) References Cited

U.S. PATENT DOCUMENTS

| | | | | | |
|---|---|---|---|---|---|
| 5,021,771 A | * | 6/1991 | Lachman | ...................... | 345/164 |
| 5,278,673 A | * | 1/1994 | Scapa et al. | ................ | 348/536 |
| 5,360,280 A | * | 11/1994 | Camacho et al. | ........... | 400/489 |
| 5,430,558 A | * | 7/1995 | Sohaei et al. | .......... | 235/462.45 |
| 5,716,274 A | * | 2/1998 | Goto et al. | .................. | 345/169 |
| 5,820,462 A | * | 10/1998 | Yokoi et al. | .................. | 463/38 |
| 5,996,080 A | * | 11/1999 | Silva et al. | .................. | 345/169 |
| 6,084,528 A | * | 7/2000 | Beach et al. | ................. | 235/383 |
| 6,107,997 A | * | 8/2000 | Ure | ............................ | 345/156 |
| 6,177,926 B1 | * | 1/2001 | Kunert | ..................... | 178/18.03 |
| 6,249,275 B1 | * | 6/2001 | Kodama | ..................... | 345/173 |
| 6,369,803 B2 | * | 4/2002 | Brisebois et al. | ........ | 178/18.03 |

FOREIGN PATENT DOCUMENTS

| | | | | |
|---|---|---|---|---|
| JP | 6-324805 | 11/1994 | | |
| JP | 06-324805 | * 11/1994 | ........... | G06F/3/033 |

OTHER PUBLICATIONS

"Sony's PIC–2000," Creative Digital Publishing, Inc., PDA Developers 4.1, Jan./Feb. 1995.

* cited by examiner

Primary Examiner—Jeffery Brier
Assistant Examiner—Ryan Yang
(74) Attorney, Agent, or Firm—Oliff & Berridge PLC (57) ABSTRACT

The operability of the various kinds of operation buttons that carry out designated functions in a portable information acquisition device is improved so as to make the device user-friendly. Pairs of operation buttons in which each pair carries out a similar kind of function are configured with one operation button of each pair provided on the left side of the device main body, and one operation button provided on the right side. Further, operation buttons that carry out similar kinds of functions are provided in a plurality of opposing configuration of pairs on both the left and right sides, respectively. When the operation buttons are formed respectively into pairs carrying out different functions, in which each pair carries out a similar kind of function, the operation buttons are arranged in symmetrical positions on the left and right. Furthermore, various kinds of operation buttons are provided above the center axis dividing the device into upper and lower parts. Also, when two operation buttons that carry out different functions are arranged adjacent to one another, the operation button positioned to be operated by the tip of the finger is made larger than the other buttons.

19 Claims, 5 Drawing Sheets

PORTABLE INFORMATION ACQUISITION DEVICE

BACKGROUND OF THE INVENTION

1. Field of Invention

This invention relates to a portable information acquisition device that displays acquired information and stores the acquired information. This invention relates in particular to a portable information acquisition device in which an arrangement of operation buttons and the like has been designed to increase operability.

2. Description of Related Art

In recent years, the use of portable information acquisition devices has become widespread. In these portable information acquisition devices, there is a function that records handwritten (or line drawing) information. This handwritten information is written on a tablet screen using an input pen or the like. In recent years, these portable information acquisition devices have been developed so that they are also capable of receiving image and audio input. This has been accompanied by an increasing diversification of functions. Thus, the utility of the portable information acquisition devices has increased to a currently high level.

Figure 8:
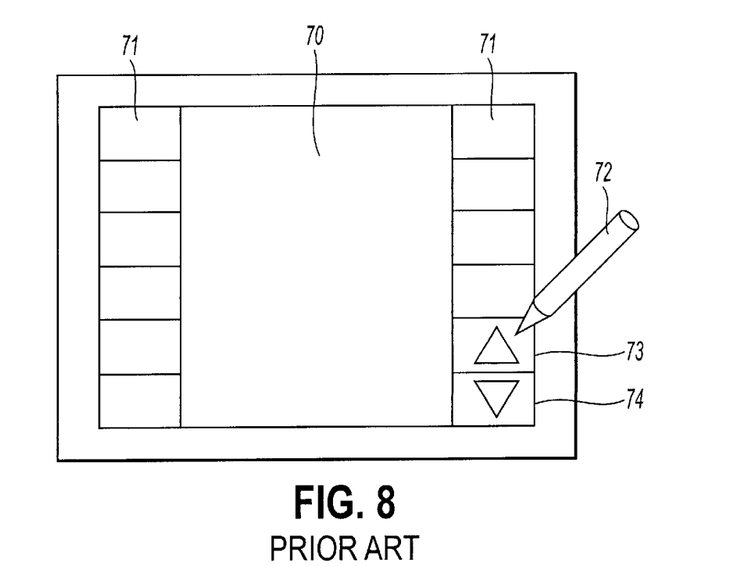
FIG. 8 shows an example of a conventional portable information acquisition device.

FIG. 8 shows in schematic the outer structure of a conventional portable information acquisition device. This device contains icons 71 for carrying out various functions that are arranged on both ends of the display screen 70. When one of the icons 71 is designated using the pen 72, it is possible to carry out the function corresponding to the designated icon. For example, if the page sequential feeding icon 73 is designated, pages on the screen 70 are displayed as sequentially fed. Conversely, if the page reverse feeding icon 74 is designated, pages on the screen 70 are displayed as reversely fed. In addition to these icons, other icons are provided to carry out various functions. By designating any of these icons, it is possible to carry out the function corresponding to the icon.

Frequently, portable information acquisition devices are used not just at an office desk but outside the office as well. For example, the user may desire to quickly confirm the content of a certain page while walking or to see the page content while on the telephone. In these instances, the user first turns the power switch of the device on, and then uses the pen 72 to designate the page sequential feeding icon 73 or page reverse feeding icon 74 in order to see the content of the page. Page content is displayed page after page on the screen 70, and page feeding is stopped when the desired information is displayed.

Therefore, in a conventional device, it was necessary to use a pen in order to designate an icon to carry out a certain function. Accordingly, even just to display received information on the screen, both hands were required because the device was held in one hand while operations requiring the use of the pen were carried out with the other. Therefore, it could be extremely difficult for the user to carry out operations if one hand is occupied holding luggage or holding a phone. As a result, the conventional portable information acquisition devices were not user-friendly.

The problem of the conventional devices was addressed by providing a button operation, making it possible to carry out operations such as page feeding (sequential feeding, reverse feeding) through operating a button. A specified function could be carried out through button operation by holding the device main body in the palm of the hand and with fingers other than the thumb, leaving the thumb free to operate the buttons. Therefore, it was possible to use only one hand to carry out the page feeding operation or the like, making it was possible to at least see the desired page content using only the free hand, even when holding, for example, luggage in the other hand.

However, these types of devices generally have the buttons arranged with a right-handed person in mind. That is, it is supposed that these devices are generally used by holding the device in the left hand and operating the pen with the right hand. Accordingly, when operation buttons are provided, they are generally in a position so that they can be operated by the thumb or the pointer finger of the left hand.

If the user only performs the page feeding operation or the like without the need to hold the pen in the hand that the user would naturally use for writing, no inconvenience is experienced. This is due to the fact that, although the button layout is intended for operation when the device is held in the left hand, the operation such as page feeding or the like does not relate to be being right-handed or left-handed. However, operation of the device becomes extremely difficult for a left-handed person when carrying out functions that require the pen to be used while also operating buttons.

Further, when a plurality of operation buttons are provided in the device, to obtain an device of necessary compactness, it becomes necessary to arrange respective operation buttons having different functions adjacent to one another. When operating one of these adjacently arranged operation buttons by finger, it is necessary to reliably press only the button to be operated.

However, because these operation buttons are small as compared to the size of the fingers, there are many instances of erroneous operations. In order to deal with this problem in the conventional devices, when plural operation buttons are arranged adjacent to one another, the operation buttons have been designed with various shapes and colors to prevent mistakes in pressing buttons. However, this only served to call the user's attention to the different kinds of buttons by visually distinguishing the buttons, and was ineffective to prevent the user, when pressing the button to be operated, from pressing another adjacent button at the same time.

Thus, there were various types of room for improvement from the point of operability in the conventional devices.

SUMMARY OF THE INVENTION

Accordingly, the object of the present invention is to realize a portable information acquisition device in which operations can be easily performed without regard for whether the user is right-handed or left-handed. Also, an object of the present invention is to design improvements in operability on various other points, both for cases when only one hand is being used to operate buttons to carry out a certain specified function, and for cases when the user presses whichever operation button holding the device in one hand and concurrently operating the pen using the other hand.

According to an aspect of the present invention, there is a portable information acquisition device capable of acquiring information that displays and stores the acquired information. The device also contains operation buttons that, upon being operated, each carries out a designated function from a plurality of different functions. In the portable information acquisition device, similar operation buttons carry out a similar kind of function from the plurality of different functions, the similar operation buttons being respectively provided on a left side and a right side of the device when the screen of the device is seen from the front. The similar operation buttons carry out a similar kind of function no matter which of the similar operation buttons is operated. The operation buttons are provided in a plural configuration of pairs on both the left and right sides. When the plurality of operation buttons are formed respectively into the pairs of similar operation buttons carrying out different functions for each pair, each pair is arranged in symmetrical positions with one of each pair on the left side and the other of the pair on the right side. The operation buttons are positioned at least above the center axis dividing the portable information acquisition device into upper and lower parts, as viewed from the front. At least two of the plurality of operation buttons that carry out different functions are arranged adjacent to one another so as to be operated by a same finger. A pressure-application surface of one operation button of the at least two operation buttons has a different size with respect to a pressure-application surface of the other of the at least two operation buttons. Also, the pressure-application surface of the one operation button is positioned so as to be operated by a tip of the finger, wherein the pressure-application surface of the one operation button is larger than the pressure-application surface of the other of the at least two operation buttons.

According to another aspect of the invention, there is a portable information acquisition device that displays and stores the acquired information. In this portable information acquisition device, a plurality of operation buttons are provided that, upon being operated, each carries out the designated function from a plurality of different functions. At least two operation buttons that carry out different functions from among said plurality of operation buttons are arranged adjacent to one another so as to be operated by a same finger. A pressure-application surface of one operation button of the at least two operation buttons has a different size with respect to a pressure-application surface of the other of the at least two operation buttons. The pressure-application surface of the one operation button is positioned so as to be operated by a tip of the finger, wherein the pressure-application surface of the one operation button is larger than the pressure-application surface of the other of the at least two operation buttons.

The present invention is a portable information acquisition device in which operation buttons are provided that, upon being operated, carry out the desired function. In this portable information acquisition device, operability is improved by designing an arrangement of operation buttons and the like.

In order to realize these improvements, in the present invention, first, operation buttons that carry out similar kinds of functions are respectively arranged on both the left and right sides of the device. As a result, they can be easily operated by either a right-handed or left-handed user. Further, even if one hand is occupied, and regardless of whether the user is right-handed or left-handed, operations such as page feeding are able to be easily carried out just using the free hand.

Further, when operation buttons performing a similar kind of function are arranged in a plural configuration (in which the functions are different by respective pairs) and in symmetrical positions on the left and right, no matter whether the device is held in the right hand or the left hand, reliable operation is possible without pressing the wrong operation button because the similar function operation buttons are positioned at the same fingers on the right and left sides. For example, reliable operation is possible using just one hand when luggage is held in the other hand, even when the buttons are operated quickly by the free hand.

Further, an improvement in operability has been designed by arranging respective kinds of operation buttons on the upper side of the device, respectively, so that each kind of operation button is positioned so as to be easily operated by the thumb or pointer finger when the device is being held in one hand.

Furthermore, when a plurality of operation buttons are arranged adjacent to one another, by making the pressure-application surface of the button positioned at the tip of the finger larger, due to the difference in pressure applied by the fingertip, it is possible to prevent operational error in which the button on the other side is pressed at the same time.

DETAILED DESCRIPTION OF PREFERRED EMBODIMENTS

Figure 1:
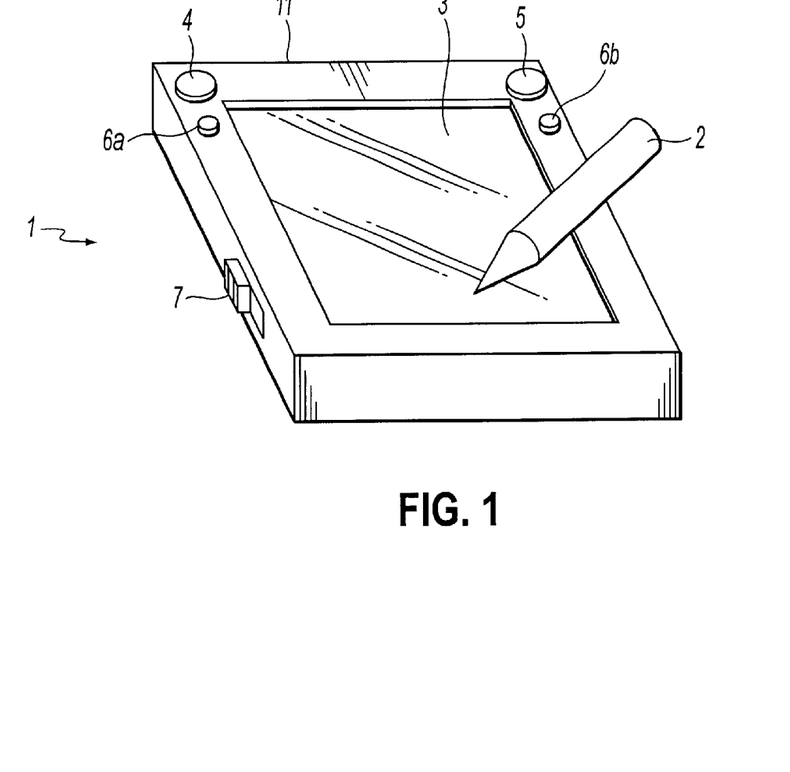
FIG. 1 is a perspective view showing in schematic a portable information acquisition device of an embodiment of the present invention.

FIG. 1 shows the outer structure of a portable information acquisition device in schematic to explain a preferred embodiment of the present invention. Although the interior of the device main body 1 is not shown in this figure, the device main body 1 accommodates various storage units, such as storage units that store the various received information and storage units that store, for example, programs necessary for running the main device as well as a controller performing various controlling functions. The device main body 1 contains components such as a pen 2 for inputting handwritten information, a next page button 4, a previous page button 5, delete buttons 6a and 6b, a power switch 7, and a screen 3 that displays the received information. Although other components may be provided as needed, only the next page button 4, previous page button 5, and delete buttons 6a and 6b are shown in this figure as the operation buttons.

The next page button 4 is used when the pages displayed on the screen 3 are fed in sequential direction. The displayed page content changes to the following pages, one page by one page. The pages are sequentially fed page by page by pressing the next page button 4 using a finger. The page displayed returns to page 1 after the last page has been reached, when the next page button 4 is continuously pressed and the pages continue to be sequentially fed in order. The previous page button 5 is used when the pages displayed upon the screen 3 are fed in a reverse direction. Pages are reversely fed page by page by pressing the previous page button 5 using a finger, and the displayed page content changes page by page in a one-page-by-one page sequence. When the sequence has returned to the first page, and the previous page button 5 is continuously pressed, pages are reversely fed, sequentially.

Thus, cyclical page feeding is accomplished by continuously pressing of the next page button 4 and previous page button 5, respectively. Accordingly, it is possible to display the desired page by operating only one of the page feeding buttons.

Delete buttons 6a and 6b are used to delete information displayed on the screen 3. For example, to delete characters written on the screen 3, the user traces the pen over the character to be deleted while pressing either one of the delete buttons 6a or 6b. The same function is carried out by pressing either of the delete buttons 6a or 6b, so that either delete button may be pressed to accomplish the deleting operation.

In the preferred embodiment described above, page-feeding buttons (next page button 4, previous page button 5) and delete buttons 6a and 6b are provided as operation buttons. In the present invention, these operation buttons are provided on the device main unit 1 as explained below.

First, buttons having similar functions are respectively provided on both the left and right sides of the device main unit 1, with the screen 3 as the center, as viewed from the front. In this preferred embodiment, the page feeding buttons and delete buttons are respectively provided in pairs, with one button of each similar kind of function in each pair.

That is, the next page button 4 is provided as a page-feeding button near the upper left of the outer frame part 11 of the screen 3 in the device main body 1. Further, the previous page button 5 is provided near the upper right of the outer frame part 11 of the screen 3 in the device main body 1. Accordingly, when the user looks at the screen 3 from the front, the next page button 4 is provided at the upper left of the outer frame part 11 of the screen 3 in the device main unit 1, and the previous page button 5 is provided at the upper right of the outer frame part 11 of the screen 3 in the device main unit 1.

When the user looks at the screen 3 from the front, the delete button 6a is provided at the upper left side of the outer frame part 11 of the screen 3 in the device main unit 1, placed at a slight interval from and below the next page button 4. The other delete button 6b is provided at a slight interval from and below the previous page button 5 at the upper right side of the outer frame part 11 of the screen 3.

Because there is a high possibility that the user will operate the page feeding buttons (next page button 4 and previous page button 5) and delete buttons 6a and 6b in this preferred embodiment while holding the pen 2 in the other hand (this is particularly true when the user is carrying out the delete function by tracing over characters with the pen 2 while pressing the delete buttons 6a and 6b), the operation buttons are provided to the left and right sides of the device main body 1. This provision eliminates the difficulty of carrying out operations with a different hand when the user is holding the pen in hand that he would naturally use for writing. That is, when these buttons are provided, for example, for a right-handed person, if it is premised that the pen 2 is held in the right hand and the operation buttons are provided on the left side on the device main body 1. For a left-handed person, and when the pen 2 is held in the left hand, operation becomes extremely difficult. Accordingly, in order to make the operation easier to the same degree no matter whether the user is right-handed or left-handed, in this preferred embodiment, the page feeding buttons (next page button 4, previous page button 5) and the delete buttons 6a and 6b are paired so there are one page feeding button and one delete button in each pair, respectively, on the left and right sides of the device main unit 1.

Additionally, although the page feeding directions are different for the next page button 4 on the left side and the previous page button 5 on the right side, it is possible to display the desired page content by operating the buttons on either side because the operation is a cyclical type, as described above.

Figure 2:
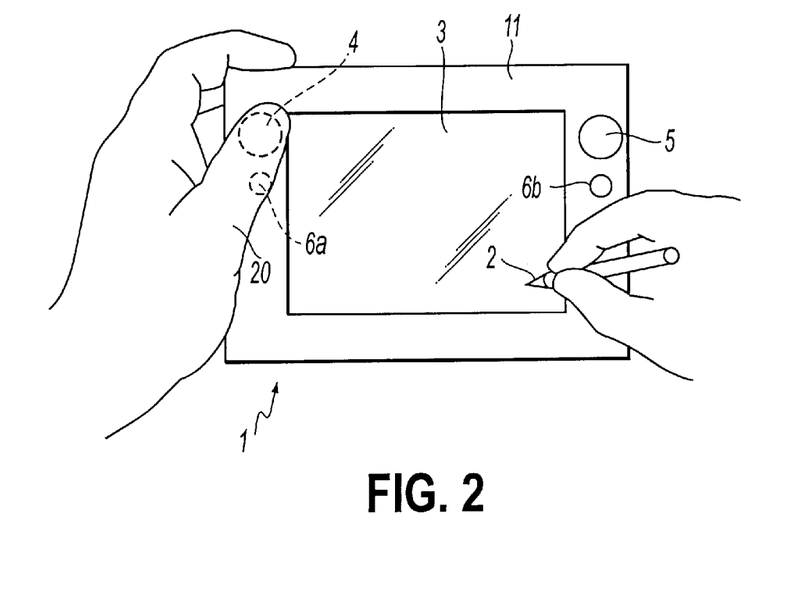
FIG. 2 shows an example of a user holding a portable information acquisition device of an embodiment of the present invention.

FIG. 2 shows the state when the device main body 1 is held in the left hand and the pen 2 is held in the right hand. In the example of FIG. 2, the device main body 1 is held by fingers other than the thumb 20 of the left hand, and the next page button 4 and delete button 6a are operated by the thumb 20.

In the converse situation from FIG. 2, even when the pen 2 is held in the left hand, through the provision of the page feeding buttons (next page button 4, previous page button 5) and delete buttons 6a and 6b on both the left and right sides of the device main body 1, it is possible to perform page feeding using the previous page button 5 and deletion using deleting button 6b with a finger (in this case, the thumb) of the right hand holding the device main body 1.

Furthermore, through this kind of operation button arrangement, even in a case not related to whether the person is right-handed or left-handed, such as when one hand is occupied, if the user desires to see the page content, it is possible to easily carry out the page feeding operation only using the hand that is free. Of course, the present invention is not limited to these operations. Other types of operation buttons designed to improve operability by being provided in individual pairs, respectively, on the left and the right, may be included in the scope of the invention.

Further, the respective operation buttons are provided in symmetrical positions, in an arrangement of the page feeding buttons (next page button 4, previous page button 5) and the delete buttons 6a and 6b on both the left and right sides of the device main body 1.

Figure 3:
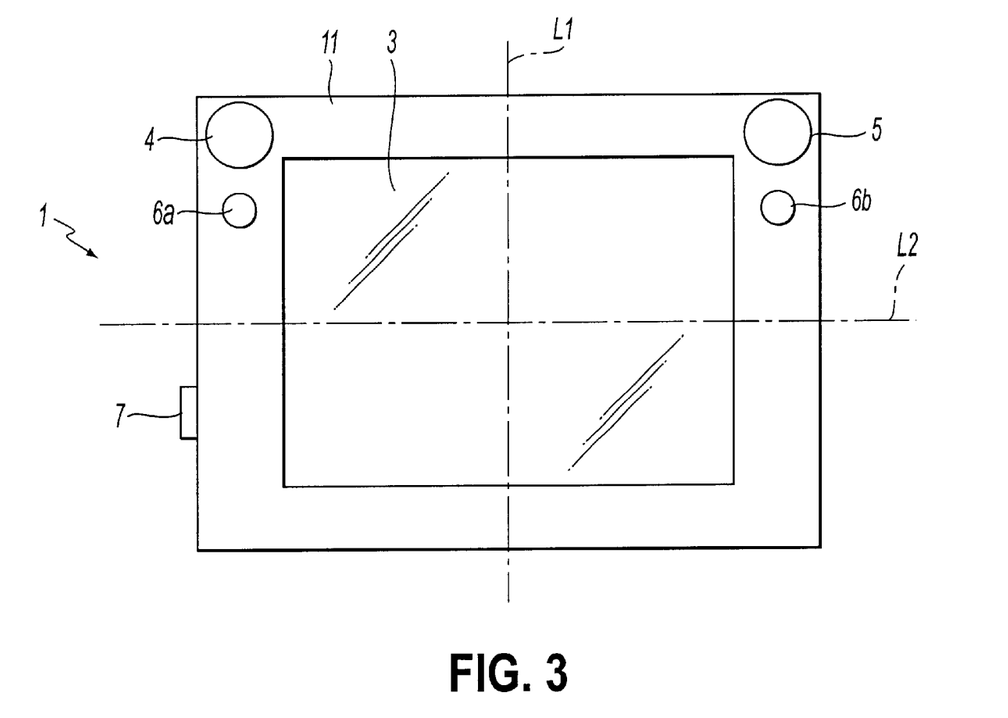
FIG. 3 is a front view explaining the installation positions of operation buttons of a portable information acquisition device of an embodiment of the present invention.

As shown in FIG. 3, when the screen 3 is viewed from the front, if the device main body 1 were to be folded at the center line L1 that divides the device main body 1 into left and right parts, the mutually opposed operation buttons would be arranged in a superimposed position. In the example of this embodiment, the next page button 4 and the delete button 6a are provided on the left side of the device main body 1, and the next page button 4 is arranged on the upper side with the delete button 6a provided below the next page button 4. The previous page button 5 and the delete button 6b are provided on the right side of the device main body 1, with the previous page button 5 at the top and the delete button 6b arranged below it. When folded at the center line L1, operation buttons that carry out a similar kind of function are superimposed.

In this way, by arranging operation buttons that carry out similar functions in symmetrical positions to the left and right of the device main body 1, whether the device main body 1 is held in the right or left hand, there is no confusion due to the placement of operation buttons when operation buttons are pressed. That is, whether the device main body 1 is held in the right hand or the left hand, because the position of the fingers of the right hand and the position of the fingers of the left hand are in symmetrical positions on the right and the left, it is intuitively easier to operate the buttons because operation buttons that carry out similar functions are symmetrically placed on the right and left sides. As a result, for example, when one is carrying luggage in one hand, even if one needs to operate it quickly using the free hand, it is possible to reliably press the desired operation button without operational error.

Further, when the screen 3 of the device main body 1 is viewed from the front, each type of operation button is arranged up above the center line L2 (shown in FIG. 3) that divides the device main body 1 into upper and lower sides.

In this preferred embodiment, the next page button 4, previous page button 5 and delete buttons 6a and 6b are respectively arranged above the center line L2.

Further, although explanation has been made with the page feeding buttons (next page button 4, previous page button 5) and delete buttons (delete buttons 6a and 6b) as examples, various other types of operation buttons not shown in this example, such as an audio input button if it is possible to take in audio, or a camera button if it is capable of taking in images, for example, are arranged above the center line L2. In this way, as the operation buttons are arranged on the upper side of the device, when the device is held in one hand, improvement in operability has been designed to allow for easy operation when operating with the thumb or pointer finger, because the operation buttons are in positions to be easily operated by finger.

When operation buttons that carry out different functions are arranged adjacent to one another, the size of the pressure-application surfaces of the respective buttons can be varied.

In the example of this preferred embodiment, when the user is looking at the screen 3 from the front, the next page button 4 is provided near the upper left on the device main body 1, and the previous page button 5 is provided near the upper right on the device main body 1. The delete button 6a is provided at the upper left on the device main body 1, at a slight distance from and below the next page button 4. The other delete button 6b, is provided at the upper right on the device main body 1, at a slight distance from and below the previous page button 5. With this kind of button arrangement, when the portable information acquisition device is as shown in FIG. 2, with the device main body 1 held in the left hand, the next page button 4 and delete button 6b are both in a position to be pressed by the thumb 20.

When the next page button 4 is positioned so as to be pressed by the tip of the thumb, there is a positional relationship such that the delete button 6a is under the ball of the thumb. Also, as for the size of the pressure-application surface, the size of the pressure-application surface of the next page button 4 which is pressed by the tip of the thumb is large, while the pressure-application surface of the delete button 6a pressed by the ball of the thumb is smaller as compared to that of the next page button 4. This is further explained using FIGS. 4(a) through 4(c). Also, although the relation between the next page button 4 and the delete button 6a is shown in FIGS. 4(a) through 4(c), the same applies for the previous page button 5 and the delete button 6b.

Figure 4A:
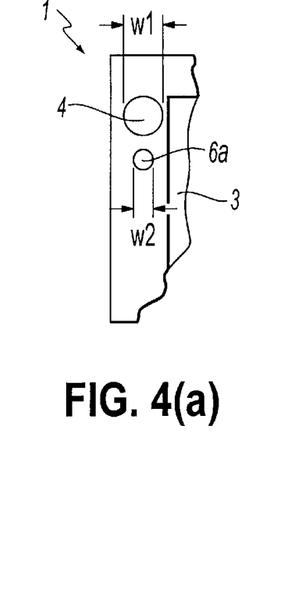
FIGS. 4(a) through 4(c) explain the operational status occurring in an embodiment of the present invention, wherein the finger of the user is shown in relation to the size of the respective operation buttons and two operation buttons are placed in an adjacent configuration.

As can be further understood from FIG. 4(a), the next page button 4 and the delete button 6a are both disk-shaped buttons in this example. Of the diameter w1 of the next page button 4 and the diameter w2 of the delete button 6a, w1 is made sufficiently larger than w2. Also, as in FIG. 4(b), when the vicinity of the tip of the thumb 20 is positioned on the next page button 4 and the ball of the thumb 20 is positioned on the delete button 6a. FIG. 4(c) is a side view showing this positional relationship, and as can be also understood from FIG. 4(c), when the tip 21 of the thumb 20 is positioned so as to be able to operate the next page button 4, the ball of the thumb 22 is positioned so as to be able to operate the delete button 6b. Also, the projection amount of the next page button 4 and the delete button 6a from the device main body 1 may be substantially the same.

The relation between the positional relationship and the size is the same for the previous page button 5 and the delete button 6b.

Figure 4B:
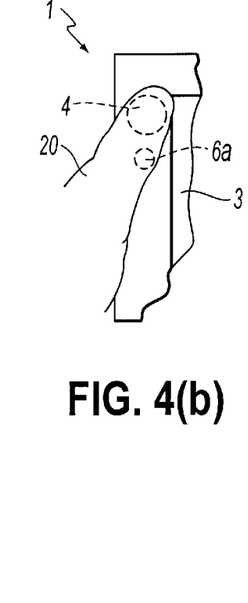
Figure 4C:
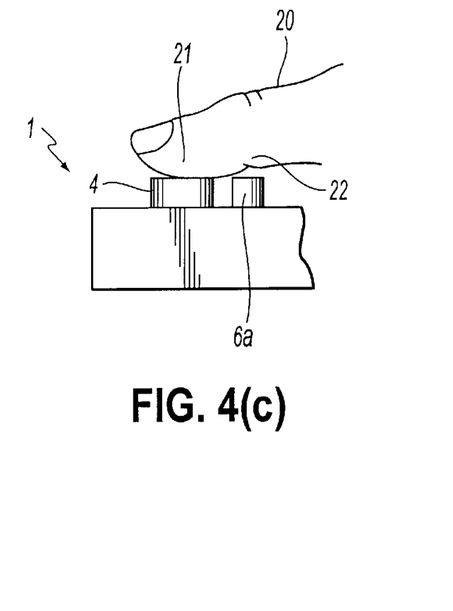

The size of the pressure-application surfaces of the buttons (in FIGS. 4(a) through 4(c), the next page button 4) positioned at the tip 21 of the thumb 20 is large as compared to that of the buttons (in FIGS. 4(a) through 4(c), the delete button 6a) positioned at the ball 22 of the thumb 20, to prevent operational error that occurs when multiple buttons are pressed at the same time when the user intends to press only one button, by the difference in pressure applied by the tip of the finger.

That is, when a button is pressed by a finger, the greatest application of force is concentrated at the tip of the finger, and the button with a large pressure-application surface which can be pressed with a slight amount of force is arranged at the tip of the finger. The button with a small pressure-application surface that is pressed with a comparatively greater force is arranged under the ball of the finger. As a result, error in pressing the buttons is prevented.

As a result, in the case of this preferred embodiment, by applying light force in the vicinity of the tip 21 of the thumb 20, without shifting the position of the thumb 20, it is possible to press only the next page button 4 (or the previous page button 5). Because a light force is applied only by the tip 21 of the thumb 20, even if the ball 22 of the thumb 20 touches the delete button 6a (or the delete button 6b), for example, great force is not applied to the delete button 6a (or the delete button 6b) and the delete button 6a (or the delete button 6b) is not put into an ON state.

Meanwhile, when operating the delete button 6a (or the delete button 6b), it is possible to press only the delete button 6a (or the delete button 6b) by applying force only in the vicinity of the ball 22 of the thumb 20.

For example, when the size of the buttons operated by the ball of a finger has the same size as the buttons operated by the tip of the finger, or the size of the buttons operated by the tip of the finger is smaller than the size of the buttons operated by the ball of the finger, there is a higher possibility an error operation will be occur due to pressing the button by the ball of the finger as well as the button at the tip of the finger at the same time.

As described above, according to this preferred embodiment, the next page button 4 and the delete button 6a are provided in the vicinity of the left end of the device main body 1, and the previous page button 5 and delete button 6b are provided in the vicinity of the right end. In this way, by arranging buttons having a similar kind of function in the vicinity of both the left and right ends of the device, respectively, it is possible for either a right-handed or left-handed user to easily operate them. If the page feeding operation is carried out in order just to see the desired page content, regardless of whether a person is right-handed or left-handed, it is possible to carry out the page feeding operation using only the free hand when one hand is occupied.

Further, by providing operation buttons having a similar kind of function symmetrically on the left and right, and positioning the similar operation buttons for the same fingers, respectively, on the left and the right hands, when holding luggage in one hand, for example, no matter whether held in the right hand or the left hand, it is possible to reliably perform the similar function by pressing the buttons with the free hand, even when the button is pressed quickly.

Further, by arranging various types of operation buttons respectively on the upper side of the device, when the device is held in one hand and operated by the thumb or pointer finger of the hand, the operation buttons are in a position to be easily operated, thus an improvement in operability has been designed.

Furthermore, when a plurality of operation buttons are arranged adjacent to one another, the pressure-application surface of the button positioned at the tip of the finger is designed to be larger than the other buttons. As a result, by the difference in pressure applied by the fingertip; it is possible to prevent the operational error of simultaneously pressing the other adjacent buttons.

Additionally, the portable information acquisition device shown in FIGS. 1 through 4(c) used in the above explanation is just an example of a basic portable information acquisition device for the purpose of explaining the present invention. It is also possible to apply the present invention to a portable information acquisition device as shown in FIG. 5.

Figure 5:
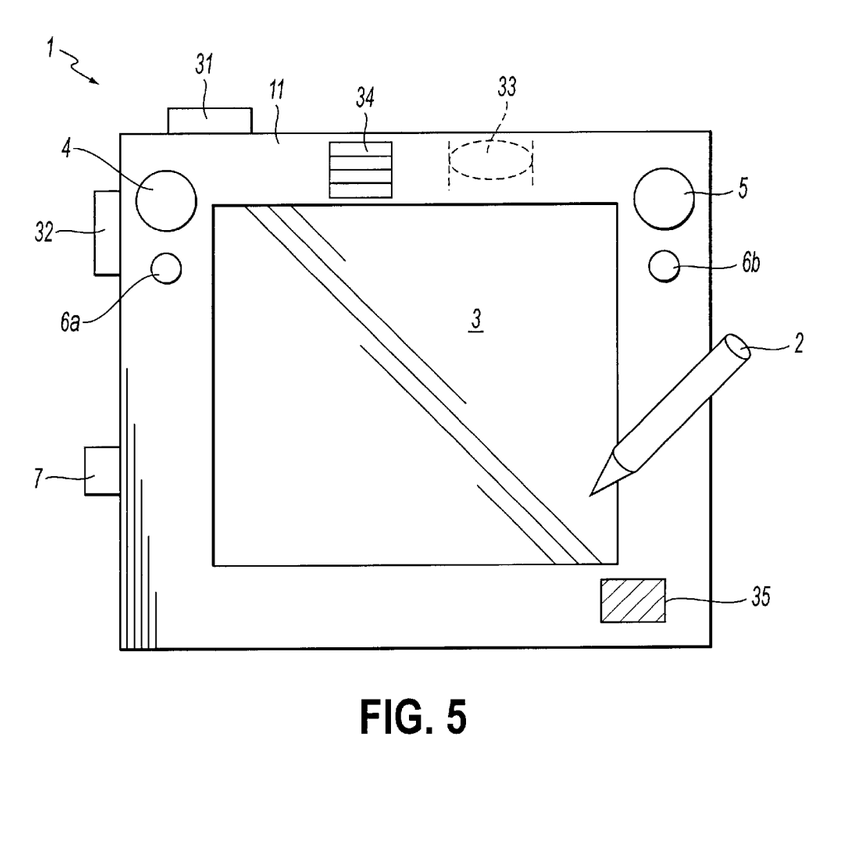
FIG. 5 is a perspective view of an embodiment of the present invention showing in schematic a portable information acquisition device that is capable of receiving not only handwriting input, but also input such as image and audio information.

The portable information acquisition device shown in FIG. 5 can receive image or audio input in addition to handwritten input by the pen 2. The same symbols are used for the parts that are the same as in FIG. 1. As operation buttons, in addition to those shown in FIG. 1, a camera button for image input 31, an audio input button for audio input 32, and the like are provided. In addition, a lens 33 for a CCD camera, a microphone 34 as the audio input part, a speaker 35 as the audio output part, and the like are provided.

Figure 6:
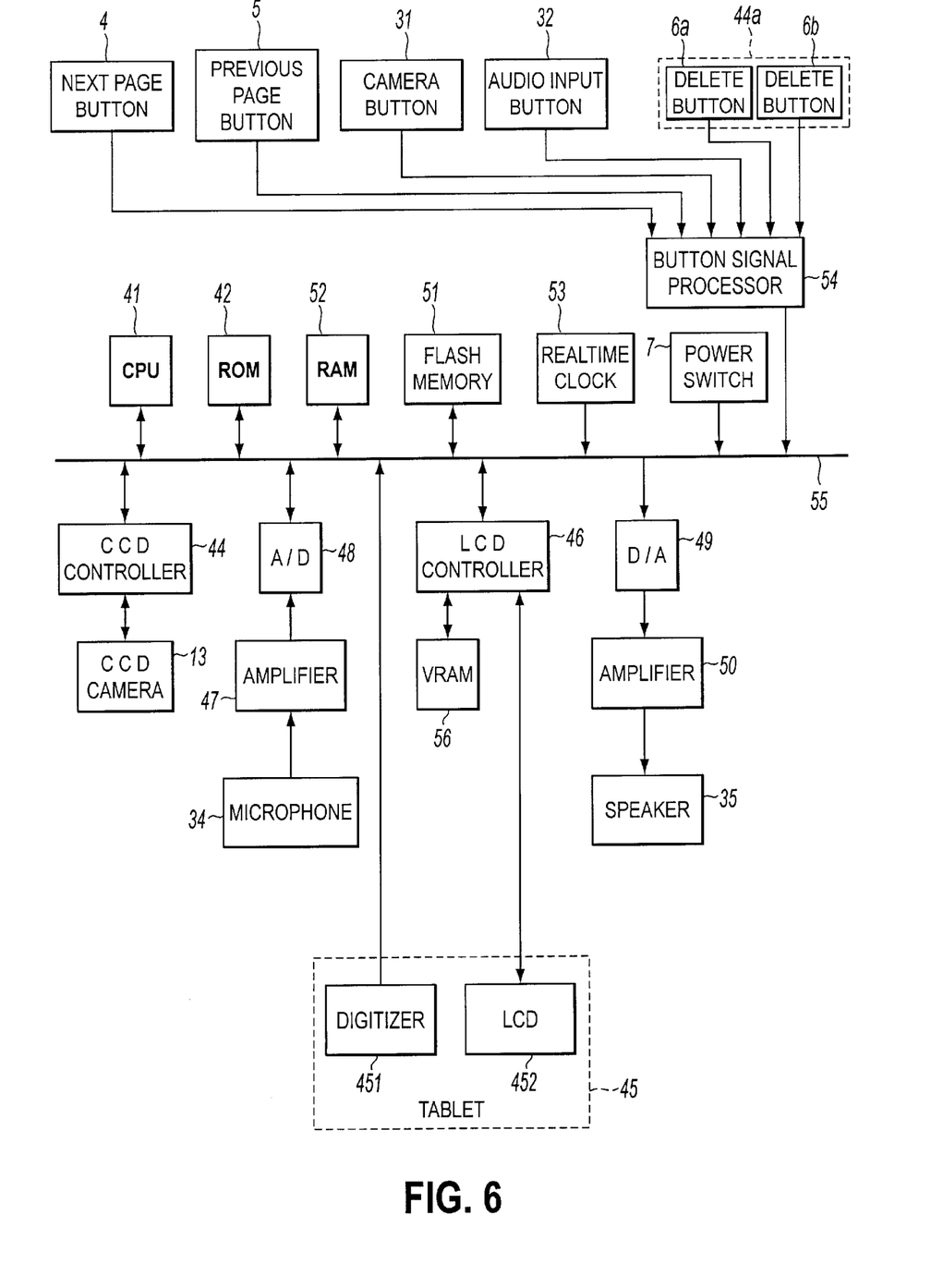
FIG. 6 is a block diagram showing the internal composition of the portable information acquisition device shown in FIG. 5.

The portable information acquisition device of the present invention, as shown in FIG. 6, contains components such as a CPU 41 and a basic processing program of the device as well as an information acquisition processing program. Furthermore, it contains components such as a ROM 42 in which data necessary for processing and the like are stored; a CCD camera 43 for receiving image information; a CCD controller 44 for driving the CCD camera 43 and converting signals from the CCD camera 43 into digital signals; a tablet 45 (an integral structure of digitizer 451 and liquid crystal display unit 452) which is an input and display unitary configuration for receiving information such as characters, line drawings and the like and displaying the received information; a liquid crystal display unit (LCD) controller 46; a microphone 34 for audio input; an amplifier 47; an A/D converter 48; a D/A converter 49 that converts digitized audio data; an amplifier 50; a speaker 35 for audio output; a flash memory 51 for data storage that stores data received by the user; a RAM 52 used as a working memory when the portable information acquisition device is carrying out various types of processing; a real time clock 53 for keeping current time and outputting time and data information; a power switch 7; page feeding buttons (next page button 4, previous page button 5); camera button 31; audio input button 32; delete buttons 44a (delete buttons 6a and 6b) for deleting written-in data; a button signal processor 54 for detecting the ON/OFF of these various operation buttons and outputting a signal corresponding to ON/OFF; a system bus 55 for connecting the various parts; and a memory (VRAM) 56 for the display, in which the content to be displayed on the LCD 452 (corresponding to the screen 3) is written in.

By such a structure, when inputting images, the lens 33 of the CCD camera 43 is directed toward the image to be received, and when the camera button 31 is first in a half-depressed state, the image input through the lens 33 is projected on the screen 3 as a moving image, and when the camera button 31 is further pressed, the image is locked in and this locked-in image is received. After the image signals are converted to digital signals, they are written into a specified address of the flash memory 51.

Further, in the case where audio is being input, when the audio input button 32 is pressed, audio is input from the microphone 34, and after this audio is digital-converted, it is written in to a specified address of the flash memory 51.

Further, the handwritten input information that was input by the pen 2 is received as coordinate point-array data from the screen 3 (tablet 45), and this coordinate point-array data is written in to a specified address of the flash memory 51

Also, when this data is received as information of a certain page opened on screen 3, image information, audio information, and handwritten input information are written in to a specified address of the flash memory 51 as information related to that page.

Explanation is made below concerning an example of carrying out acquisition of information using this portable information acquisition device. For example, a user may desire to use this portable information acquisition device for a business meeting, during which the user inputs information concerning a new product to enter the market on a date in the near future.

First, for example, when the user turns the power switch 7 on, the first page of information already received is displayed. In this state, when the next page button 4 is pressed, a screen of the second page (on which, hypothetically, information has not been received) appears.

In this state, in order to receive an image of the product, first the user initially puts the camera button 31 in a half-depressed state as described above, with the lens 33 of the camera button 43 turned toward the product to be photographed. When the camera button 31 is further pressed, the image at that moment (still image) is received. That image is displayed on the screen 3, and the image data stored at a specified address of the flash memory 51.

Also, as information related to the product, memo information such as price and market entry date are written in using the pen 2, in characters, line drawings, or the like, as ideas occur to the user. Handwritten information input such as the characters or line drawings input stay as drawn by the user, displayed on the screen 3 and stored to a specified address of the flash memory 51.

Further, as needed, the audio input button 32 is pressed, and audio input is performed. This received audio data is sent to the flash memory 51.

In this way, on a certain page opened on the screen, the received handwritten input information, image information, and audio information, are respectively written in as information related to that page to specified addresses of the flash memory 51.

Figure 7:
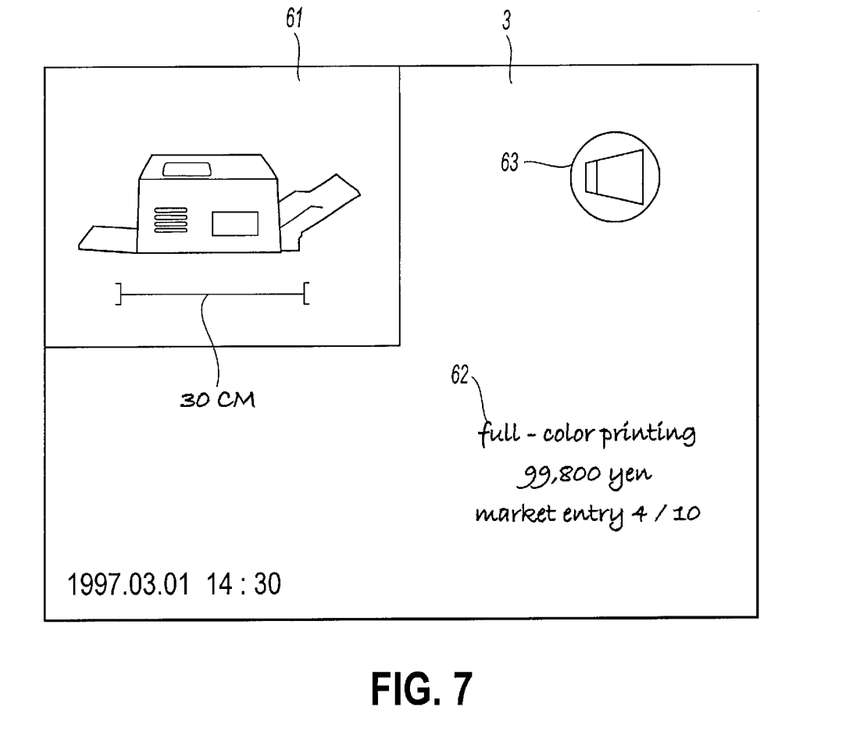
FIG. 7 shows a display example of information received using a portable information acquisition device shown in FIG. 5.

FIG. 7 shows an example of information, received by carrying out the kind of process described above, displayed on the screen 3. An icon 63 that receipt of audio have been carried out. Image information 61, handwriting input 62, displayed as and this icon 63 are page information related to one page.

Additionally, the current date from the real time clock 53 is automatically displayed, and that date (or time information) is written into a specified address of the flash memory 51 as one kind of page additional information.

Among the various operation buttons, the next page button 4, previous page button 5, and delete buttons 6a and 6b, for example, are provided in a positional relationship as explained in the preferred embodiment described above.

Further, for operation buttons such as the camera button 31 and audio input button 32, in the example of FIG. 5, when the screen 3 of the device is on the front side surface, the camera button 31 is provided on the upper side surface of the device, and the audio input button 32 is provided on the left side surface. In this way, by providing various operation buttons at the positions shown in FIG. 5, when the device is hand-held, it is possible to operate all the operation buttons by thumb or pointer finger, and it is possible to achieve a user-friendly device.

The installation positions of operation buttons such as the camera button 31 and the audio input button 32 are not limited to the example shown in FIG. 5. Within a scope that does not depart from the point of the invention, operation buttons may be provided at other positions at which they may be easily operated, respectively.

Further, in the example of FIG. 5, although the camera button 31 and audio input button 32 are provided only on one side of the device (in FIG. 5, the left side of the device), these operation buttons may also be provided on both the left and right sides. If they are provided on both the left and right sides, no matter whether held with the left or right hand, image input or audio input can be performed by the holding the device by hand.

Furthermore, the camera button 31 and audio input button 32 may be lined up in an adjacent configuration. If arranged adjacent to one another, the relation in size of the camera button 31 and audio input button 32 will be determined so that the pressure-application surface is made larger for the button pressed by the tip of the finger. As a result, when the two operation buttons are arranged in adjacent configuration, it is possible to prevent operational error by pressing the wrong operation button by mistake. Further, similar types of operation buttons are provided symmetrically on the left and right, when the operation buttons are provided in pairs, respectively, on both the left and right sides. As a result, it is possible to reliably press the desired operation button without pressing the wrong operation button in error, even in a case where the operation button is being pressed quickly by the free hand.

Further, although the preferred embodiment described above is one of the optimal preferred embodiments of the present invention, various alterations in the embodiments are possible within a scope that does not depart from the thrust of the present invention. For example, the types of operation buttons are not limited to those described above. Applications are possible utilizing various operation buttons provided on the portable information acquisition device. Further, the positional relationship of the respective operation buttons is also not limited to the description in the preferred embodiments above and various settings are possible in a scope that does not depart from the thrust of the present invention.

As described above, according to the present invention, by arranging operation buttons that carry out a similar function on both the right and left sides of the device, easy operation becomes possible no matter whether the user is right-handed or left-handed. In particular, when it is necessary to perform operations using a pen held in the writing hand while carrying out button operation by the other hand, although this button operation was extremely difficult to perform using the hand that was not one's writing hand, in the present invention, operations are easily carried out without regard to whether or not the hand is the hand the user naturally uses.

Further, by arranging buttons that carry out similar functions on both the right and left sides of the device, if the page feeding operation is carried out in order to see the desired page content, no matter whether the user is right-handed or left-handed, and even when one hand is occupied, it is possible to easily perform the page feeding operation just using the free hand. For example, during a portable phone conversation when the user is outside the office or in other similar situation, when the user wants just to see a certain page content, it is also possible to easily display the desired page content just using the free hand. Further, this ease in operation is not limited to operation of the page feeding buttons, but, in a similar way, to operation of other operation buttons as well. That is, by providing buttons on both the left and right sides, it is possible to provide a much more user-friendly device.

Further, when operation buttons having a similar function are provided in a plurality of opposing pairs, because the similar operation buttons are provided symmetrically on the left and right with the similar operation buttons positioned for the same fingers on the left and right hands, when, for example, the user is holding luggage in one hand, the similar operation can be reliably operated without error, even when operated quickly by the free hand, no matter whether the device is held in the right hand or left hand.

Further, by arranging the various kinds of operation buttons respectively on the upper side of the device, operability is greatly improved because the operation buttons are in a position to be easily operated with the device held in one hand and the buttons operated by the thumb or pointer finger of the same hand.

Furthermore, when a plurality of operation buttons are arranged adjacent to one another, because the pressure-application surface of the buttons positioned at the tip of the finger are larger, due to the difference in pressure applied by the fingertip, it is possible to prevent the occurrence of simultaneously pressing other buttons so that it is possible to reliably operate only the button that should be operated.

As a result, according to the present invention, by implementing various contrivances, such as those described above, to operation buttons that carry out designated functions, it is possible to greatly improve operability and make an extremely user-friendly portable information acquisition device that displays and stores acquired information. In particular, in a case when various kinds of operation buttons are installed in order to carry out various functions in a portable information acquisition device capable of not only receiving handwritten input, but also receiving multimedia information such as image or audio input, a much greater effect is obtained in the portable information acquisition device.

What is claimed is:

1. A portable information acquisition device that displays and stores acquired information, comprising a plurality of operation buttons that, upon being operated, each carries out a designated function from a plurality of different functions, wherein similar operation buttons carry out a similar kind of function from said plurality of different functions, the similar operation buttons being respectively provided on a left side and a right side of the portable information acquisition device, and said similar operation buttons carry out said similar kind of function no matter which of the similar operation buttons is operated, wherein at least two of said plurality of operation buttons that carry out different functions are arranged adjacent to one another so as to be operated by a same finger, a pressure-application surface of one operation button of said at least two operation buttons has a different size with respect to a pressure-application surface of another of said at least two operation buttons, and a pressure-application surface of one operation button of said at least two operation buttons is different with respect to a pressure-application surface of another of said at least two operation buttons, such that one button is operational when at least two operation buttons are pressed by the finger due to a difference in pressure applied by the finger.

2. A portable information acquisition device according to claim 1, wherein said similar operation buttons are provided in a plural opposing configuration of pairs.

3. A portable information acquisition device according to claim 2 wherein, when said plurality of operation buttons are formed respectively into said pairs of similar operation buttons carrying out said different functions for each pair, said each pair being arranged in symmetrical positions with one of said each pair on the left side of the portable information acquisition device and another of said each pair on the right side of the portable information acquisition device.

4. A portable information acquisition device according to claim 1, wherein said plurality of operation buttons are positioned at least above a center axis dividing the portable information acquisition device into an upper part and a lower part.

5. A portable information acquisition device according to claim 1, wherein the pressure-application surface of said one operation button is positioned so as to be operated by a tip of the finger.

6. A portable information acquisition device according to claim 5, wherein the pressure-application surface of the one operation button positioned so as to be operated by the tip of the finger is larger than that of the pressure application surface of the other of the at least two operation buttons.

7. A portable information acquisition device according to claim 1, wherein the same finger is a thumb.

8. A portable information acquisition device according to claim 7, wherein the pressure-application a surface of the one operation button is positioned so as to be operated by a tip of the thumb and the pressure-application surface of another of said at least two operation buttons is positioned so as to be operated by a ball of the thumb.

9. A portable information acquisition device according to claim 1, wherein the same finger is a pointer finger.

10. A portable information acquisition device according to claim 1, wherein said similar kind of function is a page feeding function.

11. A portable information acquisition device according to claim 1, wherein said similar kind of function is a delete function.

12. A portable information acquisition device that displays and stores acquired information, comprising a plurality of operation buttons that, upon being operated, each carries out a designated function from a plurality of different functions, wherein at least two of said plurality of operation buttons that carry out different functions are arranged adjacent to one another so as to be operated by a same finger, a pressure-application surface of one operation button of said at least two operation buttons has a different size with respect to a pressure-application surface of another of said at least two operation buttons, and a pressure-application surface of one operation button of said at least two operation buttons is different with respect to a pressure-application surface of another of said at least two operation buttons, such that one button is operational when at least two operation buttons are pressed by the finger due to a difference in pressure applied by the finger.

13. A portable information acquisition device according to claim 12, wherein the pressure-application surface of said one operation button is positioned so as to be operated by a tip of the finger.

14. A portable information acquisition device according to claim 12, wherein the pressure-application surface of the one operation button positioned so as to be operated by the tip of the finger is larger than that of the pressure-application surface of the other of the at least two operation buttons.

15. A portable information acquisition device according to claim 12 wherein the same finger is a thumb.

16. A portable information acquisition device according to claim 15, wherein the pressure-application a surface of the one operation button is positioned so as to be operated by a tip of the thumb and the pressure-application surface of another of said at least two operation buttons is positioned so as to be operated by a ball of the thumb.

17. A portable information acquisition device according to claim 12, wherein the same finger is a pointer finger.

18. A portable information acquisition device according to claim 12, wherein said similar kind of function is a page feeding function.

19. A portable information acquisition device according to claim 12 wherein said similar kind of function is a delete function.

* * * * *